US005414777A

United States Patent [19]

van der Schaar et al.

[11] Patent Number: 5,414,777

[45] Date of Patent: May 9, 1995

[54] PROCESS FOR THE REMOVAL OF MULTI-TRIP BOTTLES FROM CIRCULATION

[75] Inventors: Felix van der Schaar, Seuzach; Daniel Wildmann, Dielsdorf, both of Switzerland

[73] Assignee: Elpatronic AG, Switzerland

[21] Appl. No.: 146,980

[22] Filed: Nov. 2, 1993

[30] Foreign Application Priority Data

Nov. 27, 1992 [CH] Switzerland ........................ 03635/92
Feb. 4, 1993 [CH] Switzerland ........................ 00381/93

[51] Int. Cl.[6] ............................................ B65G 47/49

[52] U.S. Cl. .................................... 382/142; 348/127; 356/240; 209/526

[58] Field of Search ........................ 382/1, 8; 348/127; 250/223 B; 356/240; 209/522-524, 526

[56] References Cited

U.S. PATENT DOCUMENTS

| | | | |
|---|---|---|---|
| 4,128,752 | 12/1978 | Gravel | 219/121 L |
| 4,213,702 | 7/1980 | Bryant et al. | 250/223 B |
| 4,365,198 | 12/1982 | Toth | 324/226 |
| 4,852,415 | 8/1989 | Bogatzki et al. | 250/223 B |
| 4,929,818 | 5/1990 | Bradburry et al. | 235/381 |
| 4,948,956 | 8/1990 | Fukuchi | 250/223 B |
| 5,301,238 | 4/1994 | Apter et al. | 382/8 |

FOREIGN PATENT DOCUMENTS

| | | |
|---|---|---|
| 0354362 | 2/1990 | European Pat. Off. . |
| 3626775 | 9/1987 | Germany . |
| 4027992 | 8/1991 | Germany . |

*Primary Examiner*—Michael T. Razavi
*Assistant Examiner*—Larry J. Prikockis
*Attorney, Agent, or Firm*—McCormick, Paulding & Huber

[57] ABSTRACT

According to the process, each returning bottle is examined for the presence of a predetermined level of fatigue damage. If this level has been reached, the bottle concerned is marked with a mark enabling further trips of the bottle to be counted. When the count has reached a predetermined value, that is when the bottle has undergone the predetermined number of fillings, the bottle is removed upon its next return. It has been found that the life of the bottle can be anticipated with high accuracy in this way, thus enabling bottles to be withdrawn from circulation before failure occurs.

12 Claims, 2 Drawing Sheets

PROCESS FOR THE REMOVAL OF MULTI-TRIP BOTTLES FROM CIRCULATION

BACKGROUND OF THE INVENTION

The invention relates to a process for the removal from circulation of multi-trip bottles, in particular plastic multi-trip bottles. The invention also relates to a device for carrying out the process.

Particularly in the case of plastic multi-trip bottles, eg. PET bottles, whose life is limited, the problem arises that bottles coming to the end of their life need to be removed from circulation at the opportune time. This is important not only to prevent breakage or tearing of bottles while in use by the consumer, but also to avoid tearing or bursting of the bottle in the bottling plant during the refilling operation, in which each bottle is subjected to relatively high pressure. Hitherto, there has been no way of detecting the usual signs of damage due to fatigue - revealed in particular in the form of fine cracks of varying depth - in such a way that the end of the bottle's life can be reliably detected. In particular there has been no satisfactory way of determining the depth of the cracks.

SUMMARY OF THE INVENTION

Therefore, the problem which poses itself is to make it possible for bottles to be removed from circulation at the opportune time before they reach the end of their life, but without removing them from circulation too soon.

According to the invention this problem is solved by testing bottles returning for refilling for the presence of fatigue damage by means of a testing device; by marking individual bottles, or not marking them, with a first mark according to the outcome of the test; by detecting said mark on bottles marked with at least one such mark and by adding at least one further mark upon every return; and by removing from circulation those bottles on which the number of marks attains a predetermined value.

Surprisingly, it has been found that starting from a certain level of damage which can be detected by a testing device, a countdown of the remaining bottle trips and the removal of the bottles after a predetermined number of such trips yields a very favourable removal rate. That is to say, this process allows those bottles which would fail during one of the next few trips to be removed with a relatively high degree of certainty, while leaving in circulation those bottles which are reasonably certain to withstand a sufficient number of additional trips. There is no correlation apparent for new bottles until the appearance of fatigue cracks. A correlation is found to exist, however, from the time a detectable level of damage has occurred until final rupture.

Preferably, any bottle which has reached the level of damage which can be positively detected is accorded eight to fifteen, and in particular ten, further trips.

Preferably, the inspection for the predetermined level of damage is performed as an optical inspection, in particular by an image processing technique.

BRIEF DESCRIPTION OF THE DRAWINGS

Ways of carrying out the invention will now be described in detail by way of example with reference to the drawings, in which.

DESCRIPTION OF THE PREFERRED EMBODIMENTS

Figure 1:
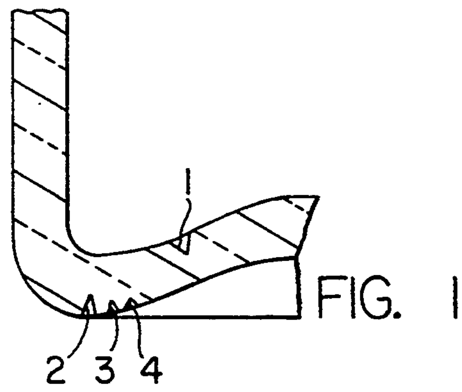
FIG. 1 shows a cross-section of part of the bottom of a bottle.

A portion of the bottom of a plastic bottle is shown in cross-section in FIG. 1. Some of the cracks, 1, 2, 3 and 4 due to material fatigue are schematically illustrated by way of example. Plastic bottles produced by the blowmoulding process are known to be subject to relatively high stresses in the bottom region. In the course of normal stressing of such bottles during cleaning and filling operations and in normal use, a large number of fine cracks occur in the bottle material, and in particular in the bottom region of the bottle. The number and depth of the cracks increase during the life of the bottle. The result is that the bottle becomes defective after an indeterminate number of trips. This is particularly liable to occur during refilling, in the course of which the bottle is subjected to a relatively high pressure of eg. 8 bar. Hitherto, no way has been found of detecting the growth of the cracks, and in particular the increase in the depth of the cracks, by means of a testing device suitable for industrial use, in such a way as to be able to determine, from the cracks or crack depths which are detected, that the bottle has reached the end of its life. However, it is known that damage in the bottom region of the bottle can in principle be evaluated by an optical inspection method, in particular from the U.S. patent application Ser. No. 07/692,367 filed Apr. 26, 1991, now U.S. Pat. No. 5,301,238 issued Apr. 5, 1994.

It has been found that fatigue damage of up to a certain level can be detected with a testing device, and in particular with the abovementioned image processing device according to U.S. patent application Ser. No. 07/692,367, now U.S. Pat. No. 5,301,238, issued Apr. 5, 1994. However, it is not possible to detect satisfactorily the further increase in the damage, and in particular the increase in the depth of the cracks. The present invention solves the problem by using an inspection device, which is preferably an image processing device, to detect the presence of fatigue damage upon every return of the bottle. If and when this damage reaches a certain level which can be reliably detected, a mark is made on the bottle, allowing subsequent returns of this bottle to be counted. When a predetermined number of further returns (counting from the detectable level of damage) have been completed, the bottle is withdrawn.

As the criterion for the presence of fatigue damage to be detected by the inspection device, the density distribution of cracks in the bottom region has been found particularly appropriate. However, it would also be possible, for example, to determine the absolute frequency and/or length of the cracks. The actual marking of bottles for which the predetermined level of damage has been reached is preferably performed by a laser. The marking of codes on bottles for other purposes is known per se. Processing and marking with lasers is also known in principle: U.S. Pat. No. 4,128,752 can be cited as an example of this. An arrangement which is especially preferred is to use the same inspection unit for detecting the markings as the one used for detecting the fatigue cracks, ie. in particular the image processing device. The carrying out of the process is then particularly straightforward. Detection of the fatigue cracks and detection of any marks previously applied can also, of course, be undertaken separately. Thus, to detect the damage, another optical detection technique may be used, for example one which uses the reflective properties of the bottle bottom; alternatively, the damage can be detected by ultrasonic inspection. The counting of the marks can likewise be performed in another way, for example by optical sensing. Also, the actual marking can of course be produced other than by laser, for example by means of a printing process.

Figure 2:
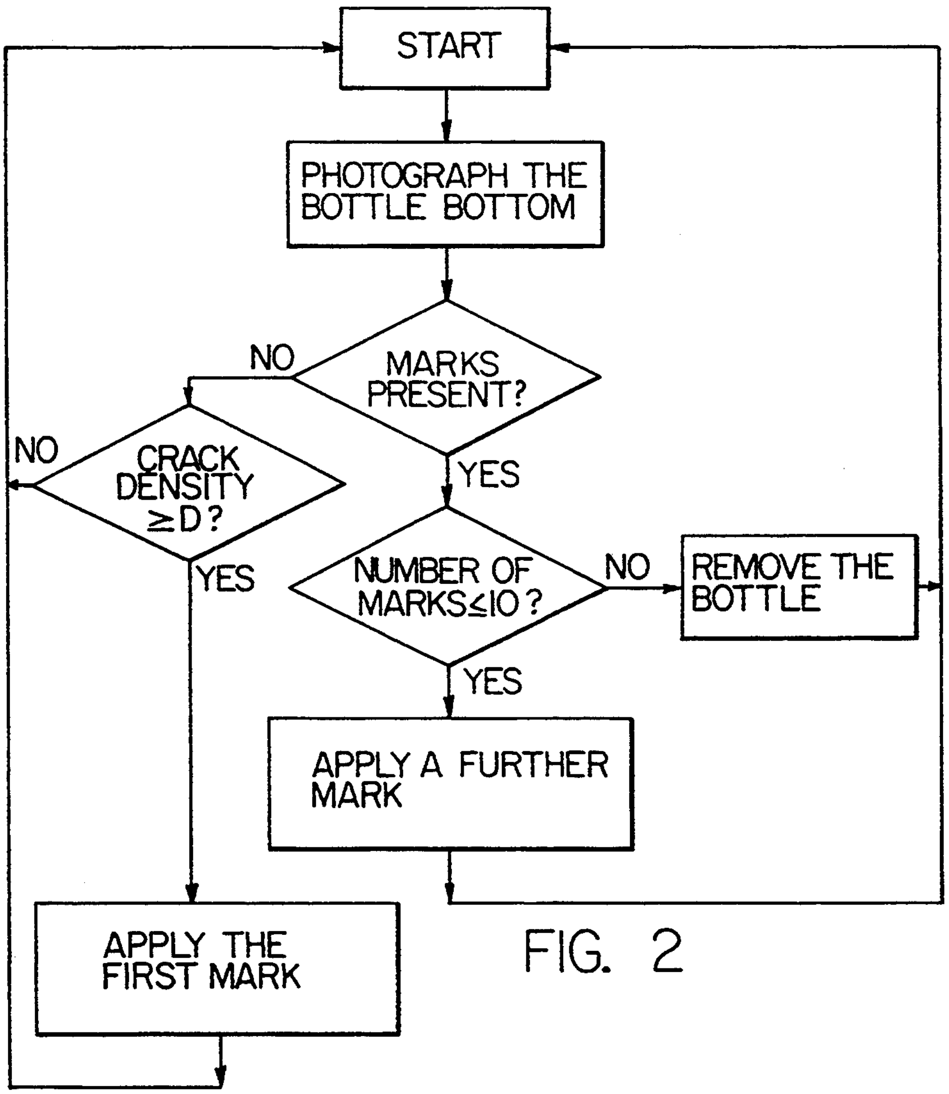
FIG. 2 shows an example of a flow diagram for the carrying out of the process.

FIG. 2 shows, in greatly simplified form, a flow diagram for the removal of bottles in accordance with the process, using an image processing technique, for example in accordance with U.S. patent application Ser. No. 07/692,367, now U.S. Pat. No. 5,301,238. A picture record is made of each bottle-bottom, and this is then analysed. If at least one mark is already present, as determined from the picture obtained, the system checks whether the number of marks has reached a defined value, in particular the preferred value of ten. If so, that is if the bottle already carries ten marks or ten counted returns, the bottle is removed, or registered as a bottle to be removed further along the conveyor line, and the next bottle is tested. If the number of marks is below the defined value, in particular below the value of ten specified as the preferred example, the bottle receives an additional mark and is left in circulation. If the system determines that the bottle still carries no mark at all, it checks whether the damage at the bottom of the bottle has reached a predetermined level. For example, it checks on the basis of the picture taken whether the crack density is greater than a predetermined value. If not, the bottle is left in circulation, without further action. If the crack density has reached the predetermined limit value, the bottle receives its first mark. This bottle will then be able to effect only a predetermined number of trips before being withdrawn.

The number of eight to fifteen trips, and in particular ten, from the predetermined level of detectable damage has proved particularly advantageous. In ten further trips, it is practically certain that the bottle will not fail. However, with only a slightly higher number of trips failure becomes quite probable. The number of additional trips to be allowed naturally depends on how the predetermined level of detectable damage is defined. It has been found that when image processing is used the increase in damage is readily detectable up to a certain level. From this level of damage, or limit value, a further increase is no longer readily detectable. This means that with the image processing technique as described in U.S. patent application Ser. No. 07/692,367, now U.S. Pat. No. 5,301,238 issued Apr. 15, 1994, and with plastic bottles of the type now in general use, namely with PET bottles, it is possible to define relatively precisely the level of damage beyond which the further trips are to be counted. This is the level of damage at which a further increase in damage can no longer be reliably detected.

Figure 3:
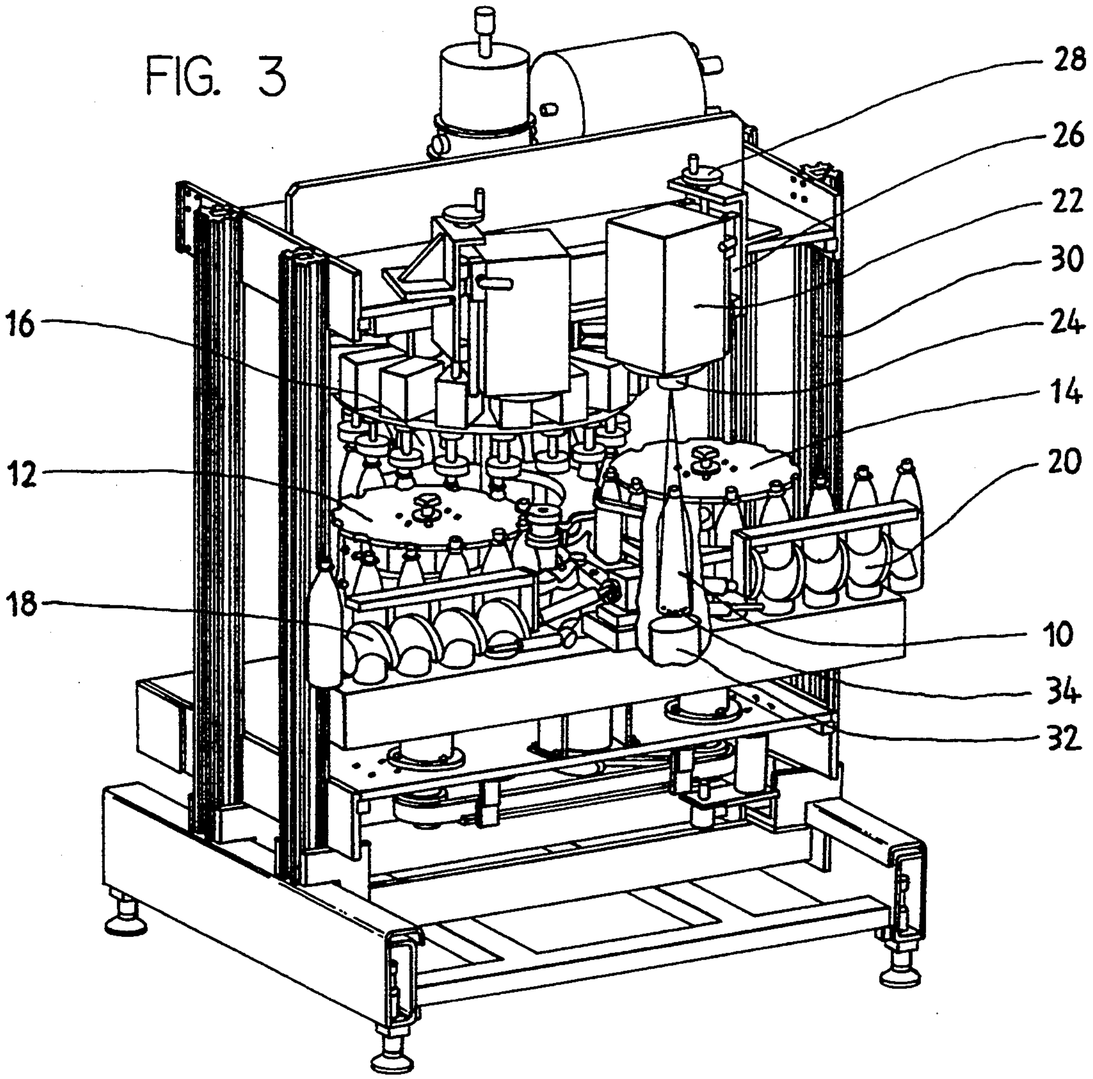
FIG. 3 shows a device for carrying out the process.

FIG. 3 shows an inspection machine for plastic bottles as disclosed by U.S. patent application Ser. No. 07/692,367, now U.S. Pat. No. 5,301,238 issued Apr. 5, 1994. This machine has a feed carousel 12 and a discharge carousel 14. Between the carousels 12 and 14 is a main carousel 16. Each station of the main carousel 16 is equipped with a complete testing unit for checking volume and leakage, bottle height, straightness, tilt of mouth, and lye residue, which will not be described in detail here. The bottles 10 are fed to the feed carousel 12 by a feed screw conveyor 18. At the discharge end, the bottles 10 are removed from the machine by a discharge screw conveyor 20. A camera box 22 is arranged above the discharge carousel 14 for the code-reading. The camera box 22 contains a camera 24, of which only the lens can be seen in the drawing. A light source 32 is arranged opposite the camera 24, and allows the bottom of the bottle, which is positioned between the light source and the camera, to be evenly illuminated.

The camera 24 is focused on the lower part of the bottle 10 so that both the fatigue cracks and a string of markings 34 (placed on the outside wall of the bottle in the region between the bottom of the bottle and the height at which the circumference of the bottle is greatest) are photographed simultaneously from inside the bottle. As the bottle 10 is moved by the discharge carousel 14 so that its longitudinal axis comes into the line between the camera 24 and the light source 32, the camera 24 takes a picture of the bottom of the bottle including the adjoining lower region of the bottle side wall, in an instantaneous exposure. This instantaneous exposure is identified with the individual bottle concerned and is analysed as has been explained in FIG. 2 for example.

Immediately downstream of the machine shown in FIG. 3, the bottle is then marked with a laser or not marked as the case may be; or the bottle is ejected from the conveyor line by an ejector device, for example with compressed air. The stations corresponding to these operations are not illustrated in FIG. 3. Such marking devices using both lasers and ink printing are well known. Ejectors of various types are also known.

We claim:

1. Process for the removal from circulation of multi-trip bottles, such as plastic multi-trip bottles, comprising the steps of:

evaluating a bottle being returned for the presence or absence of a mark indicative of the presence of a predetermined level of fatigue cracks;

testing a bottle for the presence of a predetermined level of fatigue cracks by means of a testing device as a result of determining an absence of indicative marks during the step of evaluating;

marking individual tested bottles with a first indicative mark if it is determined during the step of testing that a predetermined level of fatigue cracks is present;

adding at least one further indicative mark upon every return if an indicative mark is detected during the step of evaluating; and removing from circulation those bottles on which the number of indicative marks attains a predetermined number.

2. Process according to claim 1, characterized in that, during the step of testing for fatigue cracks, fatigue cracks are detected in the bottom region of the bottle.

3. Process according to claim 1, characterized in that the testing step is performed by optical means.

4. Process according to claim 3, characterized in that the testing step is performed by recording and analysing a picture of the bottom region of the bottle.

5. Process according to claim 1, characterized in that, during the step of testing, the density distribution of the fatigue cracks is detected.

6. Process according to claim 1, characterized in that, during the step of testing, the frequency of the fatigue cracks is detected.

7. Process according to claim 1, characterized in that the marks are applied by laser.

8. Process according to claim 1, characterized in that the testing device also detects the marks.

9. Process according to claim 1, characterized in that the bottle is removed after being marked ten times.

10. Process according to claim 1, characterized in that, during the step of testing, the length of a fatigue crack is detected.

11. Device for removal from circulation of multi-trip bottles, the device comprising:

means for evaluating a bottle for the presence of identifying marks indicative of the presence of a predetermined level of fatigue cracks;

a carousel conveyor line having testing means and marking means, the testing means for testing multi-trip bottles for a predetermined level of fatigue cracks as a result of the evaluating means determining an absence of identifying marks on a bottle, and the marking means for marking a bottle with one identifying mark when the testing means indicates a predetermined level of fatigue cracks and for marking a bottle with another identifying mark when when evaluating means determines the presence of an identifying mark on a bottle;

means for determining the number of identifying marks on a bottle; and means for removing a bottle bearing a predetermined number of identifying marks.

12. Device according to claim 10, wherein:

the testing means includes an image recording and processing arrangement;

the marking means includes at least one controllable laser, and is connected to receive at least one output signal from the image processing arrangement to control the laser;

the determining means generates a reject signal when the predetermined number of identifying marks is determined; and the removing means has an ejector for ejecting bottles which are to be removed in response to the reject signal.

* * * * *